United States Patent
Hanna

(10) Patent No.: US 9,124,798 B2
(45) Date of Patent: Sep. 1, 2015

(54) SYSTEMS AND METHODS FOR ILLUMINATING AN IRIS WITH VISIBLE LIGHT FOR BIOMETRIC ACQUISITION

(75) Inventor: Keith J. Hanna, New York, NY (US)

(73) Assignee: Eyelock Inc., Caguas, PR (US)

( * ) Notice: Subject to any disclaimer, the term of this patent is extended or adjusted under 35 U.S.C. 154(b) by 424 days.

(21) Appl. No.: 13/473,468

(22) Filed: May 16, 2012

(65) Prior Publication Data

US 2012/0293643 A1 Nov. 22, 2012

Related U.S. Application Data

(60) Provisional application No. 61/486,962, filed on May 17, 2011.

(51) Int. Cl.
*H04N 7/18* (2006.01)
*H04N 5/232* (2006.01)
*G06K 9/00* (2006.01)

(52) U.S. Cl.
CPC ........ *H04N 5/23212* (2013.01); *G06K 9/00604* (2013.01)

(58) Field of Classification Search
CPC . G06K 9/00604; G06K 9/00597; G06K 9/46; G06K 9/20; H04N 5/23212; H04N 5/02; A61B 1/041; A61B 3/113; A61B 3/145; G06F 19/30; G06F 3/017; G06F 19/321; G06T 7/0012
USPC .......................................................... 348/78
See application file for complete search history.

(56) References Cited

U.S. PATENT DOCUMENTS

| 4,641,349 A | * | 2/1987 | Flom et al. ................ 382/117 |
| 5,291,560 A | * | 3/1994 | Daugman ................. 382/117 |
| 5,572,596 A | | 11/1996 | Wildes et al. |
| 5,748,238 A | | 5/1998 | Wakabayashi et al. |
| 5,751,836 A | * | 5/1998 | Wildes et al. ............. 382/117 |
| 5,953,130 A | | 9/1999 | Benedict et al. |
| 5,999,653 A | * | 12/1999 | Rucklidge et al. ........ 382/227 |
| 6,055,322 A | | 4/2000 | Salganicoff et al. |

(Continued)

FOREIGN PATENT DOCUMENTS

| JP | 09-305765 A | 11/1997 |
| JP | 11-203478 A | 7/1999 |

(Continued)

OTHER PUBLICATIONS

JP2009193197MT, the English Translations could be generated from the JPO web sites, Aug. 2009.*

(Continued)

*Primary Examiner* — Shan Elahi
(74) *Attorney, Agent, or Firm* — Foley and Lardner LLP; John D. Lanza

(57) ABSTRACT

The present disclosure is directed towards methods and systems for acquiring biometric information of an individual. The apparatus may include a light source directing visible light towards an eye. The light source may direct the visible light at an angle of at least 30 degrees from a line of sight of the eye. The visible light may penetrate a surface of the iris, illuminating substantially the whole iris for biometric acquisition. The visible light may have an intensity level above that which causes discomfort to the eye if the visible light reaches a light-sensitive part of the eye's retina. A sensor may acquire iris biometric data from the illuminated iris.

19 Claims, 13 Drawing Sheets

(56) References Cited

U.S. PATENT DOCUMENTS

| | | | |
|---|---|---|---|
| 6,062,475 A | 5/2000 | Feng | |
| 6,088,470 A | 7/2000 | Camus et al. | |
| 6,152,563 A * | 11/2000 | Hutchinson et al. | 351/209 |
| 6,246,751 B1 | 6/2001 | Bergl et al. | |
| 6,247,813 B1 * | 6/2001 | Kim et al. | 351/206 |
| 6,252,977 B1 | 6/2001 | Salganicoff et al. | |
| 6,526,160 B1 * | 2/2003 | Ito | 382/117 |
| 6,532,298 B1 * | 3/2003 | Cambier et al. | 382/117 |
| 6,542,624 B1 * | 4/2003 | Oda | 382/117 |
| 6,546,121 B1 * | 4/2003 | Oda | 382/117 |
| 6,554,705 B1 | 4/2003 | Cumbers | |
| 6,591,064 B2 * | 7/2003 | Higashiyama et al. | 396/18 |
| 6,614,919 B1 * | 9/2003 | Suzaki et al. | 382/117 |
| 6,639,733 B2 * | 10/2003 | Minano et al. | 359/728 |
| 6,700,998 B1 * | 3/2004 | Murata | 382/117 |
| 6,714,665 B1 | 3/2004 | Hanna et al. | |
| 6,785,406 B1 * | 8/2004 | Kamada | 382/117 |
| 6,819,219 B1 | 11/2004 | Bolle et al. | |
| 6,850,631 B1 * | 2/2005 | Oda et al. | 382/117 |
| 6,944,318 B1 | 9/2005 | Takata et al. | |
| 6,950,536 B2 | 9/2005 | Houvener | |
| 6,966,681 B2 | 11/2005 | Stephan et al. | |
| 6,999,221 B1 * | 2/2006 | Sarkisov et al. | 359/244 |
| 7,007,298 B1 | 2/2006 | Shinzaki et al. | |
| 7,020,351 B1 | 3/2006 | Kumar et al. | |
| 7,047,418 B1 | 5/2006 | Ferren et al. | |
| 7,152,782 B2 | 12/2006 | Shenker et al. | |
| 7,215,491 B2 * | 5/2007 | Ueno et al. | 359/739 |
| 7,301,686 B2 * | 11/2007 | Tanaka et al. | 359/244 |
| 7,346,472 B1 | 3/2008 | Moskowitz et al. | |
| 7,398,925 B2 | 7/2008 | Tidwell et al. | |
| 7,545,962 B2 | 6/2009 | Peirce et al. | |
| 7,574,021 B2 | 8/2009 | Matey | |
| 7,660,700 B2 | 2/2010 | Moskowitz et al. | |
| 7,770,019 B2 | 8/2010 | Ferren et al. | |
| 7,801,335 B2 | 9/2010 | Hanna et al. | |
| 7,847,688 B2 | 12/2010 | Bernard et al. | |
| 7,925,059 B2 | 4/2011 | Hoyos et al. | |
| 7,929,017 B2 | 4/2011 | Aggarwal et al. | |
| 7,949,295 B2 | 5/2011 | Kumar et al. | |
| 7,949,494 B2 | 5/2011 | Moskowitz et al. | |
| 8,028,896 B2 | 10/2011 | Carter et al. | |
| 8,090,246 B2 | 1/2012 | Jelinek | |
| 8,159,328 B2 | 4/2012 | Luckhardt | |
| 8,181,858 B2 | 5/2012 | Carter et al. | |
| 8,195,044 B2 | 6/2012 | Hanna et al. | |
| 8,212,870 B2 | 7/2012 | Hanna et al. | |
| 8,214,175 B2 | 7/2012 | Moskowitz et al. | |
| 8,260,008 B2 | 9/2012 | Hanna et al. | |
| 8,280,120 B2 | 10/2012 | Hoyos et al. | |
| 8,289,390 B2 | 10/2012 | Aggarwal et al. | |
| 8,306,279 B2 | 11/2012 | Hanna | |
| 8,364,646 B2 | 1/2013 | Hanna et al. | |
| 8,411,909 B1 | 4/2013 | Zhao et al. | |
| 8,442,339 B2 | 5/2013 | Martin et al. | |
| 8,443,202 B2 | 5/2013 | White et al. | |
| 8,506,112 B1 * | 8/2013 | Dau et al. | 362/217.05 |
| 8,553,948 B2 | 10/2013 | Hanna | |
| 8,604,901 B2 | 12/2013 | Hoyos et al. | |
| 8,606,097 B2 | 12/2013 | Hanna et al. | |
| 8,719,584 B2 | 5/2014 | Mullin | |
| 2002/0061178 A1 * | 5/2002 | Winston et al. | 385/133 |
| 2002/0093645 A1 | 7/2002 | Heacock | |
| 2002/0191388 A1 | 12/2002 | Matveev | |
| 2003/0002714 A1 * | 1/2003 | Wakiyama | 382/117 |
| 2003/0012413 A1 * | 1/2003 | Kusakari et al. | 382/117 |
| 2003/0016539 A1 * | 1/2003 | Minano et al. | 362/347 |
| 2003/0081817 A1 * | 5/2003 | Nakaigawa et al. | 382/118 |
| 2004/0170304 A1 | 9/2004 | Haven et al. | |
| 2004/0240711 A1 * | 12/2004 | Hamza et al. | 382/118 |
| 2005/0008201 A1 * | 1/2005 | Lee et al. | 382/117 |
| 2005/0084179 A1 | 4/2005 | Hanna et al. | |
| 2005/0117172 A1 | 6/2005 | Plamann et al. | |
| 2005/0270386 A1 * | 12/2005 | Saitoh et al. | 348/239 |
| 2006/0028552 A1 | 2/2006 | Aggarwal et al. | |
| 2006/0073449 A1 | 4/2006 | Kumar et al. | |
| 2006/0097172 A1 * | 5/2006 | Park | 250/338.1 |
| 2006/0098097 A1 * | 5/2006 | Wach et al. | 348/207.99 |
| 2006/0113386 A1 | 6/2006 | Olmstead | |
| 2006/0115130 A1 | 6/2006 | Kozlay | |
| 2006/0164541 A1 | 7/2006 | Olmstead et al. | |
| 2006/0165266 A1 * | 7/2006 | Hamza | 382/117 |
| 2006/0274918 A1 * | 12/2006 | Amantea et al. | 382/117 |
| 2006/0279630 A1 | 12/2006 | Aggarwal et al. | |
| 2007/0036397 A1 * | 2/2007 | Hamza | 382/117 |
| 2007/0110285 A1 | 5/2007 | Hanna et al. | |
| 2007/0206839 A1 | 9/2007 | Hanna et al. | |
| 2008/0122578 A1 | 5/2008 | Hoyos et al. | |
| 2008/0158348 A1 | 7/2008 | Karpen et al. | |
| 2008/0253622 A1 * | 10/2008 | Tosa et al. | 382/117 |
| 2008/0277601 A1 * | 11/2008 | Phinney et al. | 250/505.1 |
| 2008/0291279 A1 | 11/2008 | Samarasekera et al. | |
| 2009/0175506 A1 * | 7/2009 | Polcha et al. | 382/116 |
| 2009/0274345 A1 | 11/2009 | Hanna et al. | |
| 2010/0014720 A1 | 1/2010 | Hoyos et al. | |
| 2010/0232655 A1 | 9/2010 | Hanna | |
| 2010/0253816 A1 | 10/2010 | Hanna | |
| 2011/0002510 A1 | 1/2011 | Hanna | |
| 2011/0007949 A1 | 1/2011 | Hanna et al. | |
| 2011/0119111 A1 | 5/2011 | Hanna | |
| 2011/0119141 A1 | 5/2011 | Hoyos et al. | |
| 2011/0211054 A1 | 9/2011 | Hanna et al. | |
| 2012/0127295 A9 | 5/2012 | Hanna et al. | |
| 2012/0187838 A1 | 7/2012 | Hanna | |
| 2012/0206485 A1 * | 8/2012 | Osterhout et al. | 345/633 |
| 2012/0212597 A1 | 8/2012 | Hanna | |
| 2012/0219279 A1 | 8/2012 | Hanna et al. | |
| 2012/0239458 A9 | 9/2012 | Hanna | |
| 2012/0242820 A1 | 9/2012 | Hanna et al. | |
| 2012/0242821 A1 | 9/2012 | Hanna et al. | |
| 2012/0243749 A1 | 9/2012 | Hanna et al. | |
| 2012/0268241 A1 | 10/2012 | Hanna et al. | |
| 2012/0293643 A1 | 11/2012 | Hanna | |
| 2012/0300052 A1 | 11/2012 | Hanna et al. | |
| 2012/0300990 A1 | 11/2012 | Hanna et al. | |
| 2012/0321141 A1 | 12/2012 | Hoyos et al. | |
| 2012/0328164 A1 | 12/2012 | Hoyos et al. | |
| 2013/0051631 A1 | 2/2013 | Hanna | |
| 2013/0110859 A1 | 5/2013 | Hanna et al. | |
| 2013/0162798 A1 | 6/2013 | Hanna et al. | |
| 2013/0162799 A1 | 6/2013 | Hanna et al. | |
| 2013/0182093 A1 | 7/2013 | Hanna | |
| 2013/0182094 A1 | 7/2013 | Hanna | |
| 2013/0182095 A1 | 7/2013 | Hanna | |
| 2013/0182913 A1 | 7/2013 | Hoyos et al. | |
| 2013/0182915 A1 | 7/2013 | Hanna | |
| 2013/0194408 A1 | 8/2013 | Hanna et al. | |
| 2013/0212655 A1 | 8/2013 | Hoyos et al. | |
| 2013/0294659 A1 | 11/2013 | Hanna et al. | |
| 2014/0064574 A1 | 3/2014 | Hanna et al. | |
| 2014/0072183 A1 | 3/2014 | Hanna et al. | |

FOREIGN PATENT DOCUMENTS

| | | | |
|---|---|---|---|
| JP | 2000-322029 A | 11/2000 | |
| JP | 2002-102165 A | 4/2002 | |
| JP | 2003-016434 A | 1/2003 | |
| JP | 2009-193197 A | 8/2009 | |
| JP | 2009193197 A * | 8/2009 | G06T 1/00 |
| KR | 1020020078225 | 10/2002 | |
| KR | 1020030005113 | 1/2003 | |
| KR | 1003738500000 | 2/2003 | |
| KR | 1020030034258 | 5/2003 | |
| KR | 1020030051970 | 6/2003 | |
| KR | 2003216700000 | 7/2003 | |
| KR | 1004160650000 | 1/2004 | |
| KR | 2003402730000 | 1/2004 | |
| KR | 2003411370000 | 1/2004 | |
| KR | 2003526690000 | 5/2004 | |
| KR | 2003552790000 | 6/2004 | |
| KR | 2003620320000 | 9/2004 | |
| KR | 2003679170000 | 11/2004 | |
| KR | 1020050005336 | 1/2005 | |
| KR | 2003838080000 | 5/2005 | |

(56) References Cited

FOREIGN PATENT DOCUMENTS

| KR | 1020050051861 | 6/2005 | | |
|---|---|---|---|---|
| KR | 2004046500000 | 12/2005 | | |
| KR | 10-0565959 B1 | 3/2006 | | |
| KR | 100565959 B1 * | 3/2006 | ............... | G06K 9/00 |
| KR | 1005726260000 | 4/2006 | | |
| KR | 1011976780000 | 10/2012 | | |
| KR | 1013667480000 | 2/2014 | | |
| KR | 1013740490000 | 3/2014 | | |
| KR | 1020140028950 | 3/2014 | | |
| KR | 1020140039803 | 4/2014 | | |
| KR | 1020140050501 | 4/2014 | | |
| WO | WO 2009/158662 A2 | 12/2009 | | |
| WO | WO 2012/158825 A2 | 11/2012 | | |

OTHER PUBLICATIONS

KR100565959MT, the English Traslations could be generated from the web sites, Feb. 2006.*

Chang et al, Isotropic image in structured illumination microscopy patterned with a spatial light modulator, 2009.*

Daugman et al, How Iris Recognition Works, 2004.*

Daugman, John "How Iris Recognition Works," IEEE Transaction on Circuits and Systems for Video Technology, vol. 14, No. 1, pp. 21-30 (Jan. 2004) (10 pages).

Office Action U.S. Appl. No. 13/055,943, filed Mar. 4, 2014 (19 pages).

Office Action U.S. Appl. No. 13/055,943, filed May 16, 2013 (21 pages).

International Preliminary Report on Patentability in PCT/US2009/048935 dated Jan. 5, 2011 (4 pages).

Written Opinion of the International Searching Authority in PCT/US2009/048935 mailed Feb. 9, 2010 (3 pages).

International Search Report in PCT/US2009/048935 mailed Feb. 9, 2010 (3 pages).

International Preliminary Report on Patentability in PCT/US2012/038188 dated Nov. 19, 2013 (6 pages).

Written Opinion of the International Searching Authority in PCT/US2012/038188 mailed Jan. 22, 2013 (5 pages).

International Search Report in PCT/US2012/038188 mailed Jan. 22, 2013 (3 pages).

* cited by examiner

SYSTEMS AND METHODS FOR ILLUMINATING AN IRIS WITH VISIBLE LIGHT FOR BIOMETRIC ACQUISITION

RELATED APPLICATION

The present application claims the benefit of and priority to U.S. Provisional Patent Application No. 61/486,962, entitled "Method for Biometric Recognition on a Mobile, Laptop and Other Computing Devices", filed May 17, 2011, which is incorporated herein by reference in its entirety for all purposes.

FIELD OF THE DISCLOSURE

The present disclosure relates to identity verification technologies, and more specifically to systems and methods for illuminating an iris with visible light for biometric acquisition.

BACKGROUND

Iris recognition is typically performed using infra-red illumination, as described by Oaugman for example. J. Daugman, "High confidence visual recognition of persons by a test of statistical independence," PAMI, 15(11):1148-1161, 1993. Infra-red (IR) light does not irritate or cause discomfort to a subject as much as visible light. Moreover, IR light is suitable for penetrating layers of the iris and illuminating features of the iris suitable for biometric matching or verification. The use of IR light may require a custom camera and/or illumination components which may be costly in comparison to visible light sources. While some cameras may be equipped with or accompanied by one or more visible light sources (e.g., to produce a flash) to illuminate a scene or object for example, these light sources may be very bright. When directed at the eye, light from such sources may irritate or cause discomfort to the subject. Infra-red illumination, on the other hand, is invisible to the user, and may avoid such issues. In addition, when visible light is used for image acquisition, corneal reflections of surrounding objects are often imaged and captured as artifacts. Attempts to remove the corneal reflections have been performed, but these approaches are dependent on the environment and so performance may be unpredictable. An example of this approach is "Separating Reflections in Human iris Images for Illumination", Wang, H., Lin, S., Liu, X., and Kang, S. B. In Proceedings of ICCV. 2005, 16911698.

SUMMARY

In one aspect, the present disclosure is directed to an apparatus for acquiring biometric information of an individual. The apparatus may include a light source directing visible light towards an eye. The light source may direct visible light towards an eye at a first angle that avoids a light-sensitive portion of the eye's retina. The visible light may have an intensity level that would cause discomfort to the eye if directed at the light-sensitive portion of the retina. The visible light may have an intensity level that exceeds the intensity level of other visible light incident on the cornea. The light source may direct the visible light at an angle of at least 30 degrees from a line of sight of the eye. The visible light may be incident upon a surface of the iris. The visible light may illuminate the iris for biometric acquisition. The visible light may illuminate substantially the whole iris for biometric acquisition. The visible light may have an intensity level above that which causes discomfort to the eye if the visible light reaches a light-sensitive part of the eye's retina. The light source may have an intensity level that exceeds the intensity of visible ambient light incident on the cornea. A sensor may acquire iris biometric data from the illuminated iris.

In some embodiments, the light source comprises a point light source directing a visible light beam at the eye. The light source may comprise directing a visible light beam at the eye, the visible light beam having a full width half brightness (FWHB) of less than 90 degrees. The light source may direct visible light comprising non-isotropic illumination at the eye. In some embodiments, the visible light beam may have full width at half brightness (FWHB) of less than 90 degrees. The apparatus may include a mobile device. The light source and the sensor may be incorporated on the mobile device. The light source may be mounted on a frame or device worn over the individual's eye, face or head. The light source may direct the visible light towards a non-nasal side of the eye. In some embodiments, the apparatus may include an illuminated screen or second visible light source for dilating the pupil.

In certain embodiments, the visible light beam may have a full width at half brightness (FWHB) of less than 90 degrees. The visible light may comprise a cone of visible illumination and may be of sufficient intensity to illuminate the whole iris via light diffusion within a portion of the eye. The light source may direct visible light of sufficient intensity to illuminate striations of the iris for biometric acquisition. The light source may direct the visible light at an angle that avoids reaching a light-sensitive portion of the eye's retina. In some embodiments, the light source directs, towards the eye, visible light having an intensity level below a threshold limit for safe exposure to the eye. The light source may be positioned to avoid illumination of a surface of the eye as the user positions the device for use. The light source may be directionally positioned to avoid illumination of the eye as the user adjusts the apparatus for use, until the apparatus is positioned within a suitable spatial region for biometric acquisition. The apparatus may include a channel for shaping visible light from the light source into a visible light beam for illuminating the iris. In some embodiments, the apparatus includes a screen providing visual cues to suitably position the light source relative to the eye for the biometric acquisition. The apparatus may include an audio feedback module providing audio cues to suitably position the light source relative to the eye for the biometric acquisition.

In one aspect, the present disclosure is directed to method for acquiring biometric information of an individual. A light source of a biometric acquisition apparatus may direct visible light towards an eye at a first angle that avoids a light-sensitive portion of the eye's retina. The visible light may illuminate the iris for biometric acquisition and may have an intensity level that (i) would cause discomfort to the eye if directed at the light-sensitive portion of the retina and (ii) exceeds the intensity level of other visible light incident on the cornea. A sensor of the biometric acquisition apparatus may acquire iris biometric data from the illuminated iris.

In some embodiments, the light source directs the visible light from a mobile biometric acquisition device on which the sensor is mounted. The light source may direct the visible light from a frame or device worn over the individual's eye, face or head. The light source may direct the visible light from and/or towards the non-nasal side of the eye. The light source may direct the visible light that includes non-isotropic illumination at the eye. The biometric acquisition apparatus may include and/or use an illuminated screen or second visible light source to constrict the pupil.

BRIEF DESCRIPTION OF THE DRAWINGS

The following figures depict certain illustrative embodiments of the methods and systems described herein, where like reference numerals refer to like elements. Each depicted embodiment is illustrative of these methods and systems and not limiting.

DETAILED DESCRIPTION

Figure 1A:
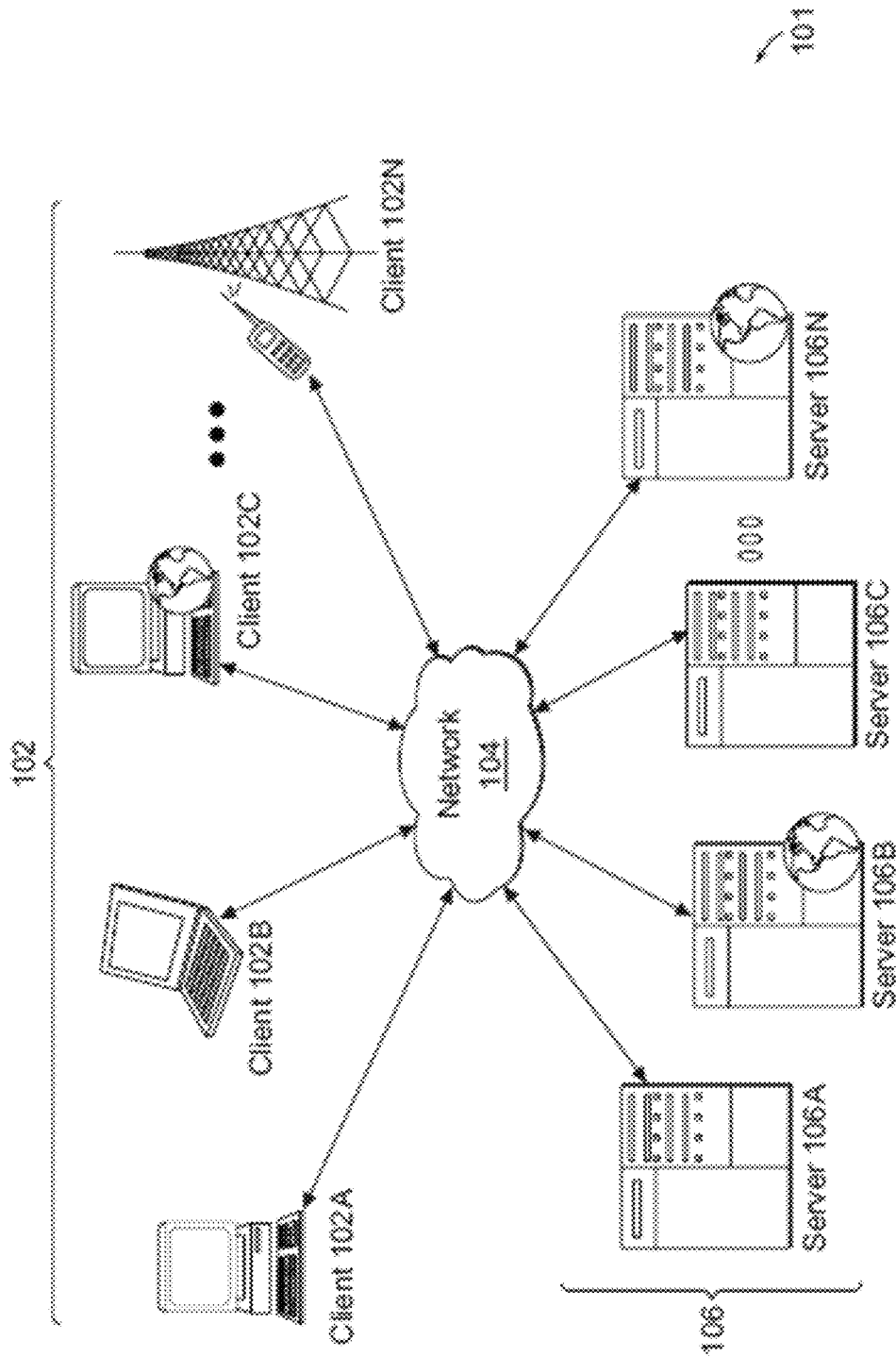
FIG. 1A is a block diagram illustrative of an embodiment of a networked environment with a client machine that communicates with a server.

Before addressing other aspects of the systems and methods for illuminating an iris with visible light for biometric acquisition, a description of system components and features suitable for use in the present systems and methods may be helpful. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
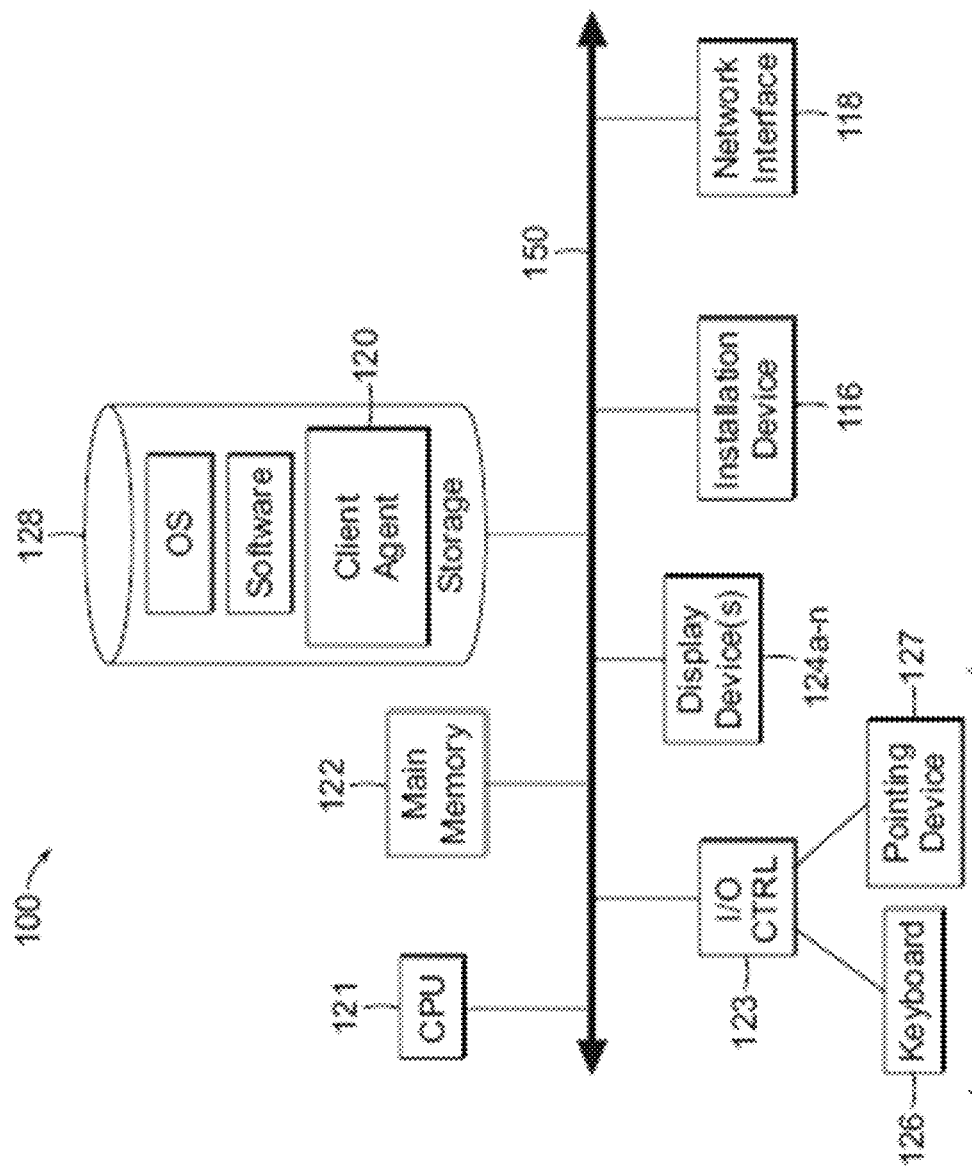
FIGS. 1B and 1C are block diagrams illustrative of embodiments of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
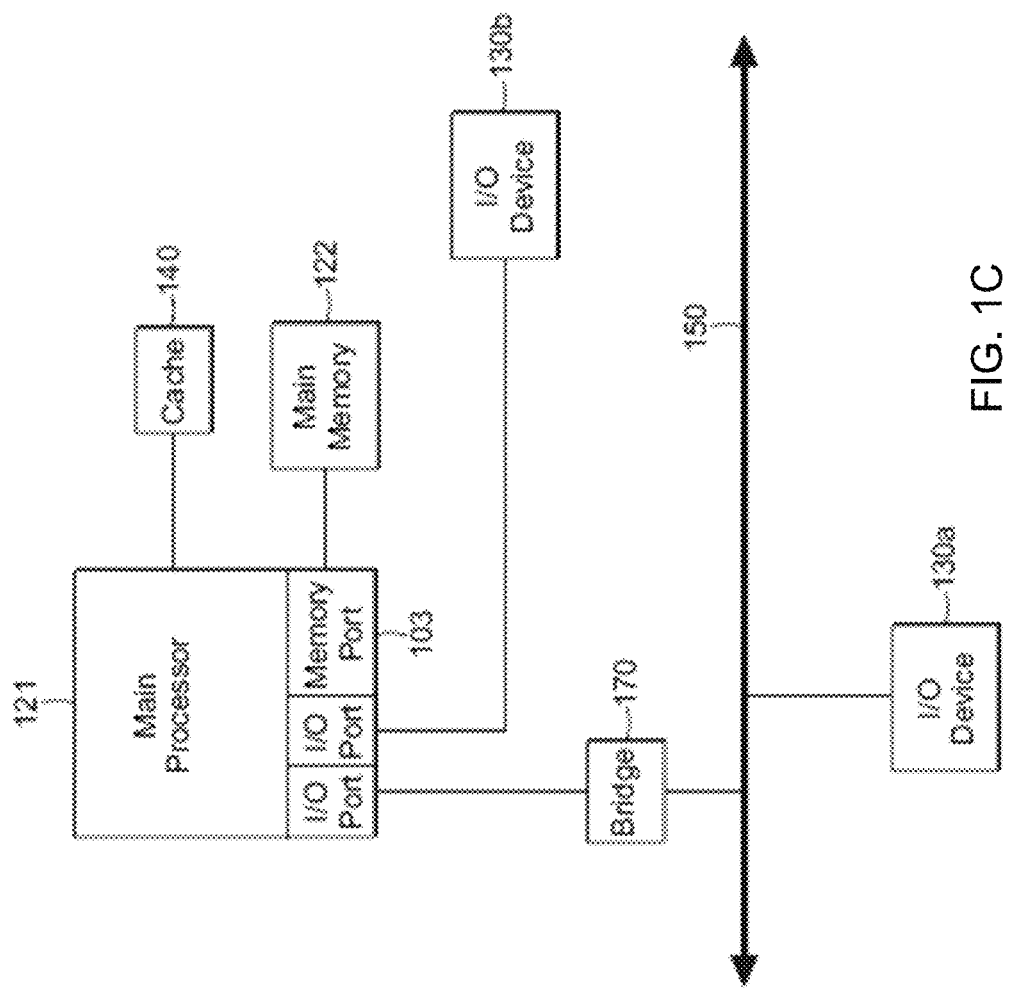

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

Having described embodiments of computing devices and environments that may be suitable for the methods and systems for illuminating an iris with visible light for biometric acquisition, certain embodiments of the methods and systems will be described in detail. The individual may be involved in one more logical and/or physical access transactions. Embodiments of the present systems and methods may use acquisition and/or matching of potentially disparate biometrics at each point of transaction. In some embodiments, the present systems and methods may provide means to ensure the provenance of each step within each transaction and/or between each transaction.

In some embodiments, the present disclosure is directed to a system for performing biometric recognition on a mobile, laptop and/or other computing platform. The system may include at least a camera to face the individual while in some embodiments of operation. The system may optionally include a screen that faces the person in certain embodiments of operation. One of the challenges with biometric recognition, particularly of the human iris, is that the depth of field of the camera gets smaller as the object being images gets closer to the camera. Since the human iris is a small object, the camera may be focused very close to the subject (for example, approximately 6"). The depth of field may be sufficiently small at this distance so that autofocus algorithms may be able to focus on the nose or other objects in the scene, but may be unable to provide a focused image of the iris.

Some embodiments of the present systems and methods resolve this problem in a number of ways. First, we may use the separation between the eyes as an estimate of the distance of the person to the camera. Eye separation may be assumed to be relatively fixed between individuals. For example, eye separation may vary between 50-75 mm in adults and is perhaps less for children. For example, "Variation and extrema of human inter-pupillary distance", Neil A. Dodgson, pages 36-46 in Proc. SPIE Vol. 5291, Stereoscopic Displays and Virtual Reality Systems XI, A. J. Woods, J. O. Merritt, S. A. Benton and M. T. Bolas (eds.), 19-22 Jan. 2004, San Jose, Calif., USA, ISSN 0277-786X, describes this variation.

Certain embodiments of the present systems and methods may handle the variation between individuals using a refinement process as described herein. As an initial step, we may assume that the eye-spacing is nominally at a fixed distance, which may be approximately 63 mm. The biometric system can locate the positions of at least one eye by performing an eyefinder algorithm, and may acquire images of the eye(s). The biometric system can compute, calculate or otherwise determine a pixel distance between the left and the right eyes. A pixel distance may be a count or number of pixels representing a separation or distance between the eyes on an image. The biometric system can input or feed the pixel distance into a Look-Up Table that outputs a desired focus setting. This focus setting may be sent to an active focus mechanism which moves focus to one or more eyes.

The Look-Up table can be populated in a number of ways. One method is to use a fixed look up table that is calibrated at manufacture. In this method, a table is generated or computed by placing a picture of a face (e.g., with eyes separated nominally by 63 mm) at different distances from the camera, separated at intervals (e.g., approximately 1 cm intervals). The camera auto-focus may be allowed to operate and focus only on the eyes, while the resultant focus value can be read-off from the focus mechanism. The image corresponding to each focus value can be processed, and the pixel separation computed. Another method of populating the table includes performing a refined calibration which may be user-specific. Typically, there may be one primary user for a mobile, personal or other type of device. Rather than using an image or picture of the person for computation or calibration, the calibration process can use the real person for the computation or calibration. A set of images in and around the nominal focus provided by the basic look up table can be acquired at different focus settings. The eyes from the images can be detected, and the image with an optimal focus around the eye region can be detected. The focus value corresponding to this image can be matched to the eye separation computed for that image. Linear interpolation can be used to determine a focus setting if the actual subject is positioned at a location between two points in the look up table. By way of example, optimal focus can be computed by performing a Sobel edge detector in the eye region and computing the maximal energy between the images in the set.

While the calibration process may take some amount of time to perform (which may be a short process in any case), this may be performed once for the user of the device. Subsequent verification processing can then happen very rapidly. Once the identity of the user has been determined using a subsequent biometric algorithm, the profile and lookup table for that particular person can be switched in as a first lookup table to be tried. This process can allow multiple users to use a device, and still have a calibration table uniquely set up for each of them. In some embodiments, the biometric system can use the detected iris diameter rather than the eye separation, in a similar way as discussed above, to providing camera focus. In this case, the nominal iris diameter may be assume to be approximately 11 mm, for example.

In some embodiments, an alternative way to overcome the autofocus problem is to detect the location of the eyes as described above, and then direct the autofocus algorithm to the eye region alone. It may sometimes be desirable to include corresponding eyebrows in some cases since eyebrows include fine texture that may expedite processing by the autofocus algorithm. In certain embodiments, portions of the nose, such as a tip of the nose, should be excluded since it may be at a significantly closer distance to the camera than the eyes.

In another aspect, embodiments of the present systems and methods may use eye separation and/or a scale of the output of a face detector for focusing a camera. A face detector system can inform the user that the user is out of range for image acquisition and may encourage the user to move the user or an operated device to a better operating point. Using the same calibration methods above (e.g., calibration at the factory and/or per-user calibration), we estimate the approximate distance of the user to the device. The biometric system can inform the user in a variety of ways to tell them to move closer or further away, and in any direction. One method is to indicate a small horizontal bar on the biometric device's screen near the camera, which may increase in length and/or change color (e.g., from red to green), as the user moves to or away from a reasonable operating range. By using a bar or other indicator, the user can receive feedback that they are moving in the wrong direction. For example if the user is too far away and moves even further away, the bar may move further away from a green zone to the right of the screen for example. As the user moves towards the device, the bar may head progressively towards a desirable green zone. The bar may be located as close to the camera as possible since the user can be looking at the camera, and at the same time be aware of the bar in the screen. In some embodiments, the user can look at the bar until they are approximately at the correct distance/location, and can then glance up at the camera for biometric capture. In certain embodiments, the bar or other visual feedback may be located within 5" of the camera that is acquiring biometric imagery.

In another aspect, certain embodiments of the biometric system may use audio feedback. For example, the biometric device may produce an increase in frequency output of a tone as the user approaches an optimal operating point. Thus, if the tone is reducing in frequency, the user can know that the user is moving in the wrong direction.

In some embodiments, the biometric system may use illuminators designed or constructed to improve or optimize illumination on the face and/or iris of the person. Illumination may be provided over one or more active regions of interest. In practice, concerns about power, cost and/or real-estate area on the device may constrain the extent or amount of illumination. We may address this problem by configuring or designing the biometric device to direct the light so that certain areas of the field of view are illuminated more than others. In this way, the amount of illumination required may be reduced. The areas of the field of view that are illuminated more may be selected by predicting where the user is likely to be positioned. We have found that users are not necessarily positioned randomly anywhere within a field of view. For example, in the case of a laptop application, a camera is typically centered in the middle of the screen. Thus, the user's lateral position (left/right) is more typically centered with respect to the screen. However, the user's vertical position may vary widely, due to the variation in the height of the user (e.g., even when sitting) and/or due to variation in the angled position of the laptop screen. The biometric device may be configured to direct light so that a central vertical section of the field of view is illuminated most, consistent with an expected location of the user. The biometric device may direct the light by a variety of methods. One method is to physically mount light-emitting objects (LEOs) so that they are positioned or oriented at different angles. In another embodiment, diffusers that diffuse light differently in the vertical orientation compared to the horizontal direction can be placed in front of one or more LEOs.

In another embodiment, the biometric system may use visible light as a means to perform recognition of the face and eye. Iris recognition is typically performed using infra-red illumination, as described by Daugman for example. J. Daugman, "High confidence visual recognition of persons by a test of statistical independence," *PAMI*, 15(11):1148-1161, 1993. Infra-red (IR) light does not irritate or cause discomfort to a subject as much as visible light. Moreover, IR light is suitable for penetrating layers of the iris and illuminating features of the iris suitable for biometric matching or verification. The use of IR light may require a custom camera and/or illumination components which may be costly in comparison to visible light sources. While some cameras may be equipped with or accompanied by one or more visible light sources (e.g., to produce a flash) to illuminate a scene or object for example, these light sources may be very bright. When directed at the eye, light from such sources may irritate or cause discomfort to the subject. Infra-red illumination, on the other hand, is invisible to the user, and may avoid such issues. In addition, when visible light is used for image acquisition, corneal reflections of surrounding objects are often imaged and captured as artifacts. Attempts to remove the corneal reflections have been performed, but these approaches are dependent on the environment and so performance may be unpredictable. An example of this approach is "Separating Reflections in Human iris Images for Illumination", Wang, H., Lin, S., Liu, X., and Kang, S. B. In Proceedings of ICCV. 2005, 16911698.

In some embodiments, the biometric device addresses some of the problems discussed above by directing bright visible light at the eye at an angle to its line of sight. In certain embodiments, this angle, theta, may be very steep. A significant or substantial amount of the visible light may not be directed through the pupil onto sensitive parts of the retinal surface. The visible light can reach a surface of an iris and illuminate the iris. Using this method, bright visible illumination can be provided without causing discomfort to the user. In some embodiments, a biometric system can provide a bright light from a small point source, of an intensity high enough to overcome much of visible ambient light incident on and/or reflected off the eye. This means that corneal reflections and other artifacts that may be otherwise present in visible iris imagery, which can impair iris recognition, can be significantly suppressed by a bright light source. In certain embodiments, a light source, such as a bright LED, may be mounted at the edge of the device in order to increase or maximize the incident light's angle with the eye's line of sight. In some embodiments, an angle, theta, at or greater than 30 degrees is used. In certain embodiments, the angle may be measured between a) a line between the user/eye and the light source, and b) a line perpendicular to the plane of the iris. In some embodiments, (b) may be represented by a line of sight of the eye.

As discussed, iris recognition is typically performed using infra-red light. However, there may be certain applications that use cameras or sensors that are only sensitive to visible illumination. For example, sensors in camera phones or other mobile devices are typically not configured for iris biometric acquisition. These sensors may instead be optimized or configured to acquire imagery under visible light. For example, IR-cut filters may be applied to some of these sensors to remove IR "artifacts" from the images. To incorporate biometric acquisition features in these and other existing devices, it may be costly to retrofit, reconfigure or incorporate these devices, e.g., with IR light sources and/or IR sensors.

Figure 2A:
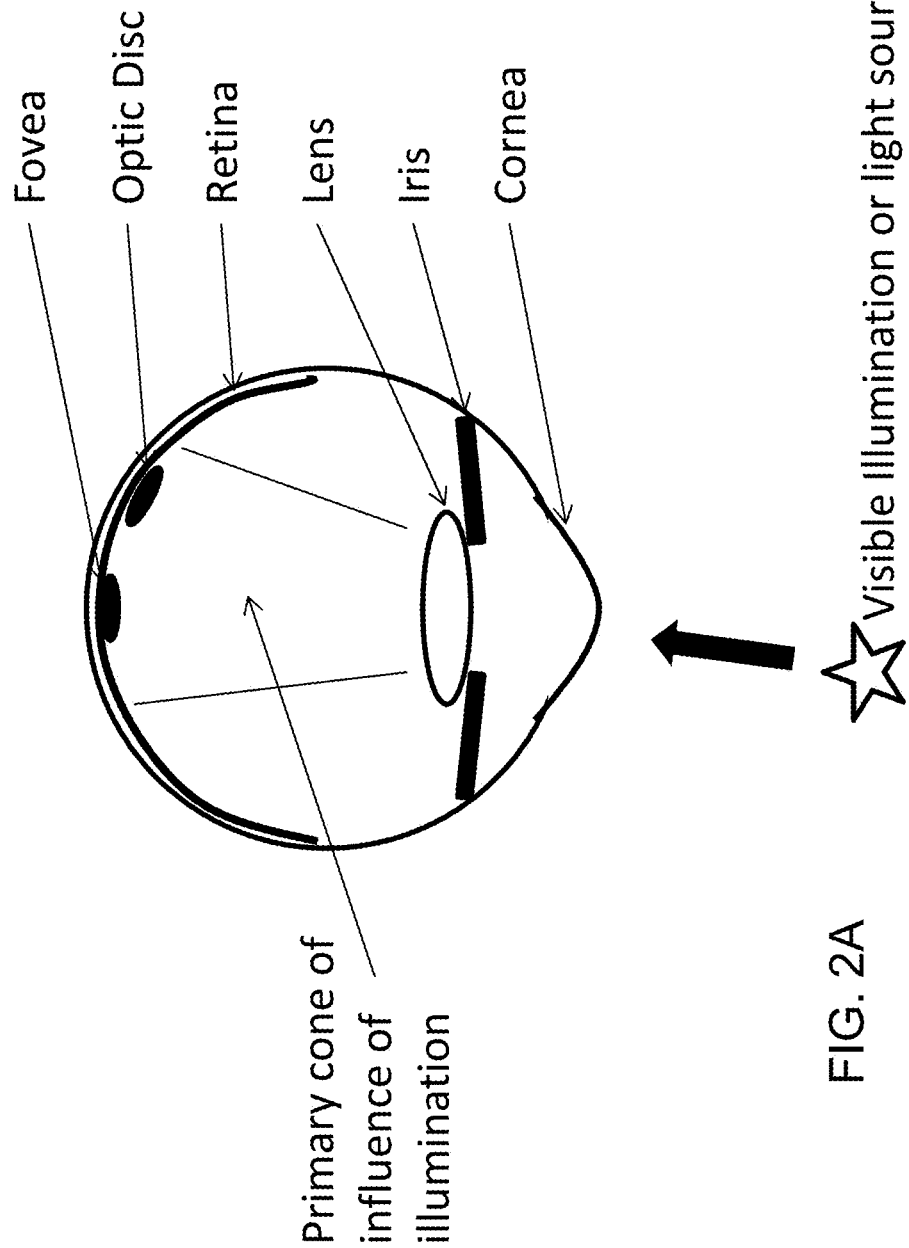
FIG. 2A depicts a schematic layout of an eye in which visible illumination or light is directed towards the eye.

FIG. 2A depicts a schematic layout of an eye in which visible illumination or light is directed towards the eye. A biometric system, which may include a biometric device or apparatus, can provide the visible illumination. In the embodiment depicted, a primary cone of influence resulting from the incident visible illumination subtends a wide angle across the surface of the retina, and can intersect or overlap with the fovea of the eye. The primary cone of influence may include light dispersion, refraction and/or diffusion resulting from the transmission of light through the pupil and other parts of the eye, which may result from the shape and/or refractive index of certain portions of the eye.

If the illumination is sufficiently bright, certain bioeffects can occur. These bioeffects include one or more of: a blink reflex which is an involuntary closure of the eyelids to prevent further discomfort, an after-image or distortion in the user's vision, and a perception of glare, all of which cause discomfort to the eye. As an example, the ANSI Z136.1 standard for laser LEDs bases the discomfort blink reflex maximum permissible exposure on a 0.25 second exposure, after which the subject is expected to blink. This yields a maximum permissible exposure of about 2.6 mW/cm^2. After-image discomfort can occur at a lower level of about 0.1 mW/cm^2, and glare discomfort may occur at 5 uW/cm^2. It may not be desirable for a light source to induce bioeffects that are uncomfortable for the user, from a device that may be expected to be used frequently and/or voluntarily. In addition to bioeffects that affect discomfort, the ICNIRP Guidelines for Exposure of the Eye to Optical Radiation from Optical Instruments specifies safety exposure limits for visible illumination. Various embodiments of the biometric systems disclosed herein are designed and/or configured to avoid these bioeffects and/or address the safety exposure limits. At the same time, the biometric systems disclosed herein may be designed and/or configured to use illumination levels that exceed the illumination levels of other visible or ambient light incident on the cornea, in order to acquire imagery of the iris uncontaminated by ambient reflections.

In certain contexts, visible light intended for illuminating an iris may have to compete with other ambient visible illumination present from the environment. The ambient visible illumination can cause contaminating artifacts or reflections off the cornea (and/or any other surface of the eye) from surrounding objects. These surrounding objects can include any reflecting object or light source. In certain embodiments, the biometric system, which may include any device or apparatus, may address such competing illumination by increasing the magnitude or intensity of visible illumination that is incident on the iris to illuminate the iris for biometric purposes. For example, the biometric system may provide a strong or bright visible illuminator for purposes of biometric acquisition, and may place the illuminator close to the eye, to drown out or overwhelm other ambient effects. As such, the visible illuminator can dominate the photons incident on the iris as well as the cornea of the eye. The effect or influence of contaminating illumination from surrounding objects can therefore be minimized or reduced.

Figure 2B:
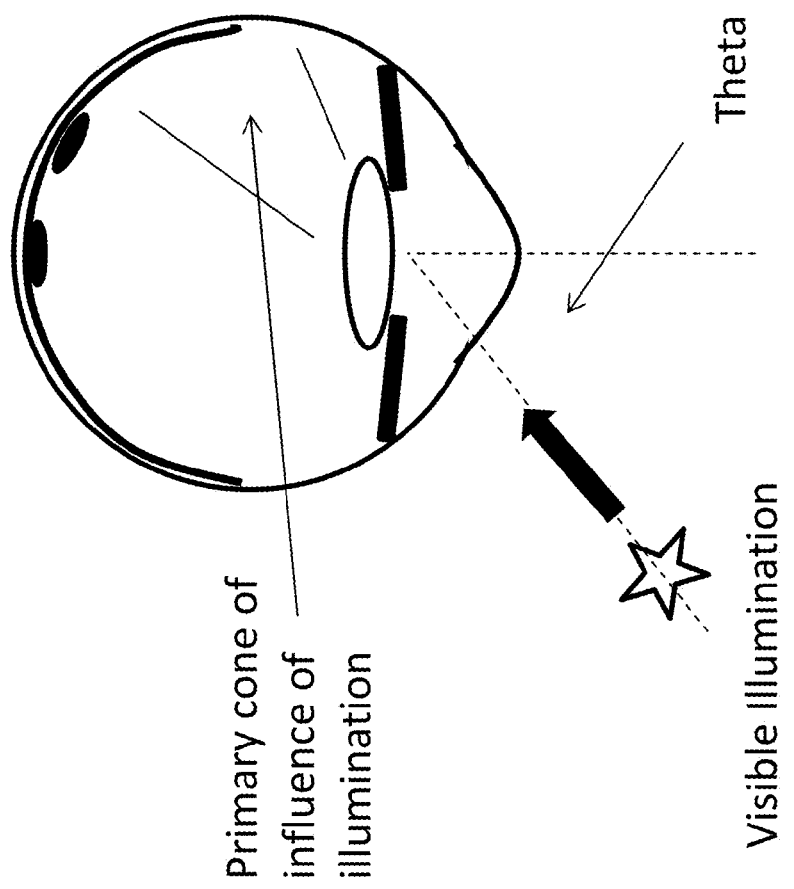
FIG. 2B depicts one embodiment of a method for providing visible illumination to an iris for biometric acquisition.

In some embodiments, increasing the intensity level of the visible illuminator can expose the eye to visible illumination above levels that can induce bioeffects as described earlier. FIG. 2B depicts one embodiment of a method for providing visible illumination to an iris for biometric acquisition. The biometric system may be configured to provide or direct visible illumination or light at a significant angle theta, for example greater than 30 degrees, towards one side of the eye. This may serve at least two main purposes. First, due to the increased angle theta, fewer photons may be transmitted through the pupil. The resulting primary cone of influence of illumination may be smaller than in the case when illumination is incident to the eye/pupil at a smaller angle. Second, the primary cone of influence may be positioned or directed away from the fovea, e.g., towards the end of the retinal surface thereby reducing the perception of brightness, and any discomfort, by the user.

Figure 3:
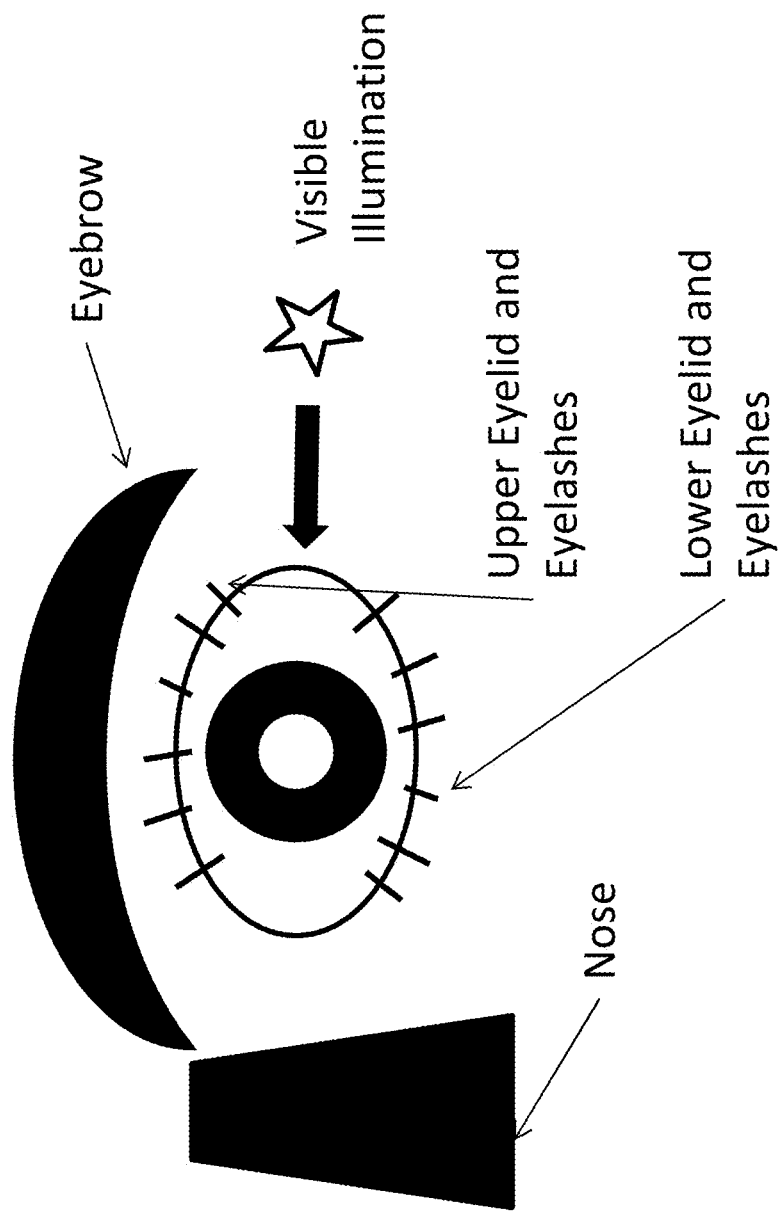
FIGS. 3-7, depict embodiments of methods and systems for providing visible illumination to an iris for biometric acquisition.

Referring now to FIG. 3, another embodiment of a method and system for providing visible illumination to an iris for biometric acquisition is depicted. The biometric system may position a visible light source or illuminator such that the light source is substantially offset horizontally from the center of an eye, at the opposite side to the nose's position relative to the eye. By directing visible light from one side of the eye (e.g., the non-nasal side), the illumination that reaches the iris may be substantially free from obstruction from facial features. For example, by directing visible light towards the non-nasal side of the eye, the biometric system can reduce or prevent shadows and blockages from eyebrows and top eyelashes, the nose and/or from bottom eyelashes. Such shadows can reduce illumination reaching the eye or iris, and may cause uneven or distorted illumination of the iris. In addition, such shadows or blockages may contaminate an acquired image of the iris with unwanted texture and/or artifacts.

Figure 4:
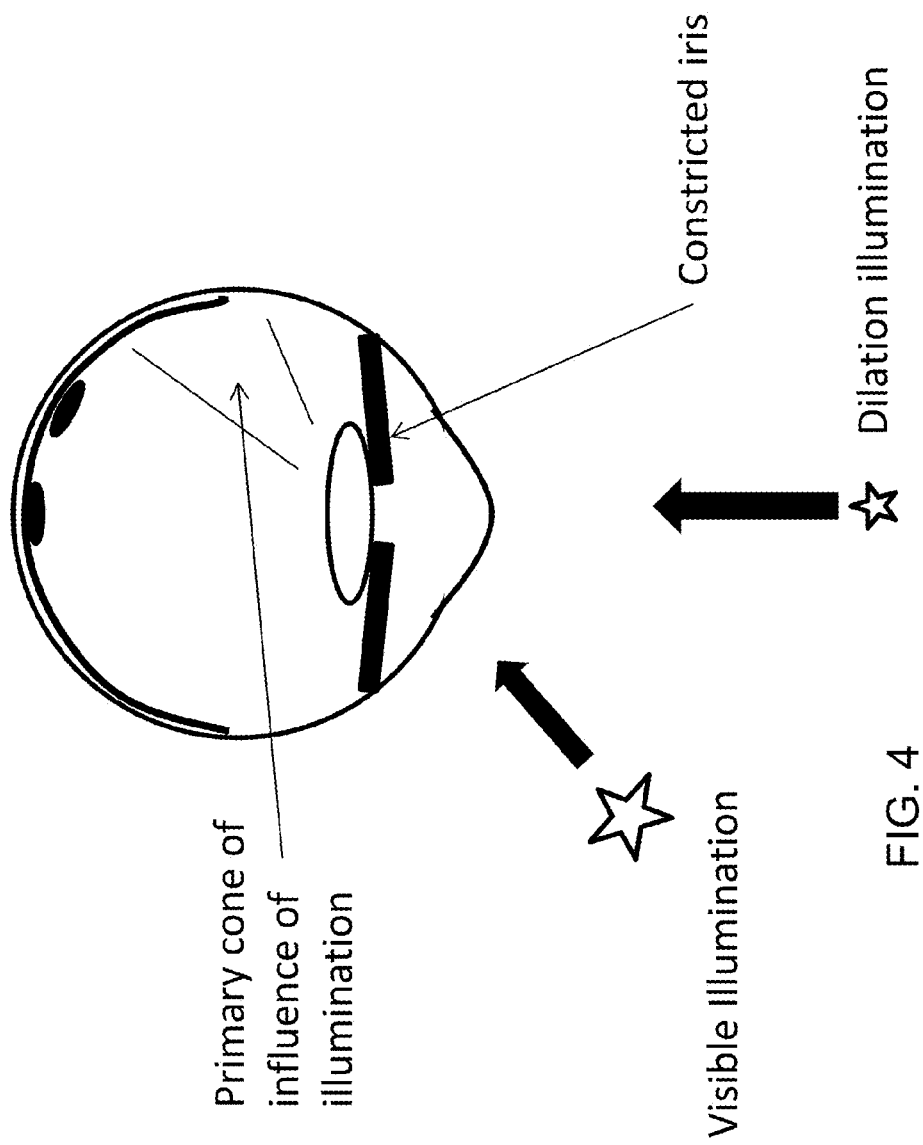

Referring now to FIG. 4, yet another embodiment of a method and system for providing visible illumination to an iris for biometric acquisition is depicted. The biometric system may be configured to constrict an iris or constrict pupil for the purpose of increasing the area of the iris that is visible for biometric capture and identification. The biometric system may want to constrict the iris and/or the pupil (e.g., to reduce the size of the pupil and/or increase the surface area of the iris) to reduce the number of photons that can pass through the pupil, which may ultimately cause discomfort if the photon reaches a light-sensitive portion of the retina in sufficient numbers. The biometric system can constrict the iris or pupil by using a visible, low-intensity illuminator or light source (such as the screen of a mobile device) positioned in front of the user. The low-intensity illuminator or light source may be sufficiently comfortable to the eye, for example, when the iris or pupil is constricted. In some embodiments, the low-intensity illuminator or light source is activated at an appropriate time before or during biometric acquisition, so that the iris/pupil can react to the low-intensity illuminator or light source.

Figure 5:
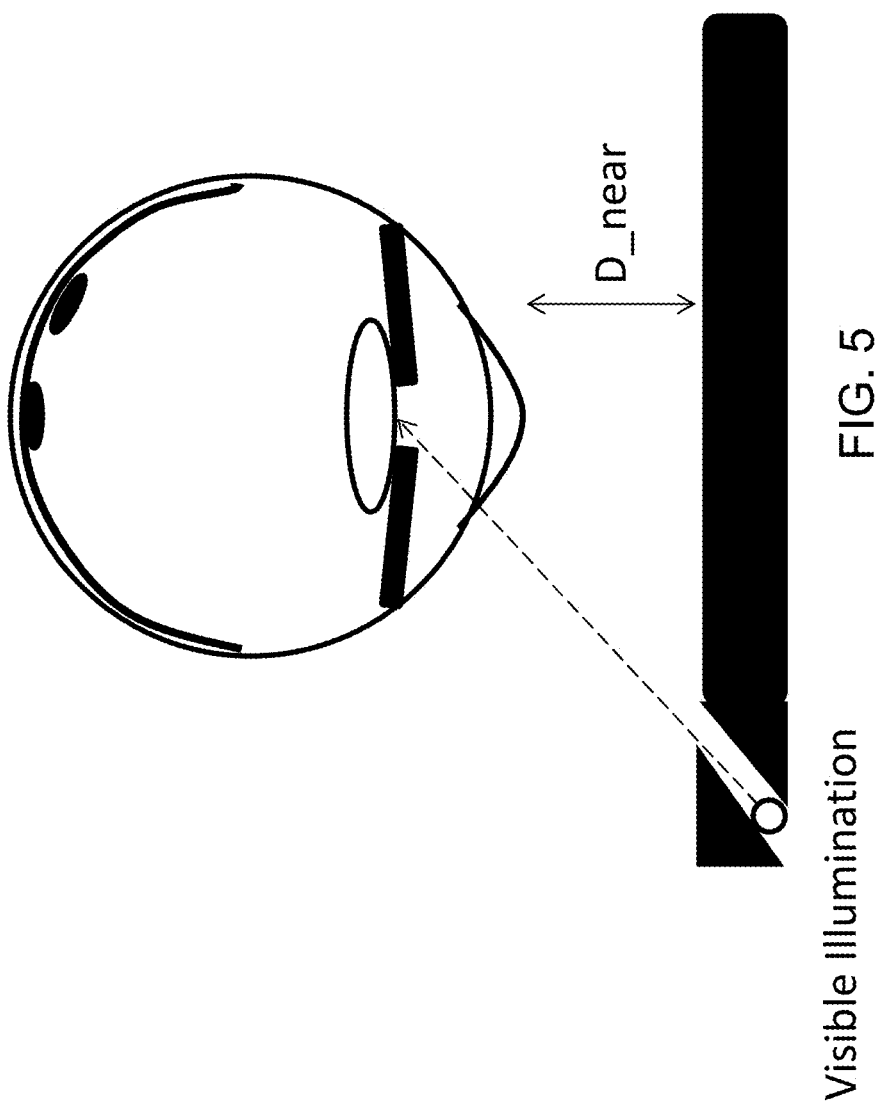

Referring now to FIG. 5, still another embodiment of a method and system for providing visible illumination to an iris for biometric acquisition is depicted. In some embodiments, the light source provides visible light that is non-isotropic or anisotropic. Such light may be directional in nature, instead of being diffused. The visible light source or illuminator for illuminating the iris may comprise a point light source. The light source may produce a light beam pattern (e.g., conical or tear-drop-shaped pattern) having a full width half brightness (FWHB) of 90, 40, 20, 10, 4 degrees for example. The point light source may be of sufficient intensity to provide light that illuminates the iris for proper biometric acquisition. Illumination sources (e.g., for efficiency reasons) may have a non-isotropic beam pattern, such that the maximal intensity is projected at 0 degrees from the device, and the intensity diminishes continuously as it deviates away from the 0-degree direction of projection. The rate of reduction in intensity is typically characterized by a full-width half brightness (FWHB) value, which is the beamwidth in degrees at which the intensity is half the brightness of the maximal intensity at zero degrees.

One characteristic of the eye is that sensitivity of the eye is generally logarithmic to light intensity. As such, even at a large angle (e.g., deviating from the 0-degree projection direction), where the illumination intensity may be only 10% of the maximal illumination for example, this level of brightness may still be sufficient to cause discomfort to the eye if the maximal illumination is above a level sufficient to cause discomfort to the eye. For example, as discussed elsewhere in the specification, widely varying intensities (e.g. 2.6 mW/cm2 and 0.1 mW/cm^2) can each cause discomfort. This is potentially an issue, for example, when a user is holding the device further from the face, and a portion of the light beam pattern of the light source can still reach the eye and cause discomfort to the user's eye. We address this problem by providing a means to shape or truncate the conical beam pattern of the light source so that virtually no illumination is transmitted at angles with respect to the light source that are greater than those corresponding to an operating region of the iris recognition device.

One embodiment for providing this shaping or truncation is to position the visible light source or illuminator for illuminating the iris within a light channel that is opaque to visible light (e.g., narrow physical channel), so that a narrow light beam may be formed exiting the light channel. Thus, the beam pattern from the light source is truncated rather than diminished at larger illumination angles with respect to (e.g., the zero degree projection direction of) the light source. The geometry of the channel width and the depth of the LED in the channel may dictate the angle above which the illumination beam pattern is truncated or shaped. The biometric device may direct the light beam towards an eye, in various ways as discussed herein (e.g., from a non-nasal side, angled at least 30 degrees, etc). In some embodiments, the biometric system uses a directional illumination or light source and directs the visible light at the preferred angle theta.

Figure 6:
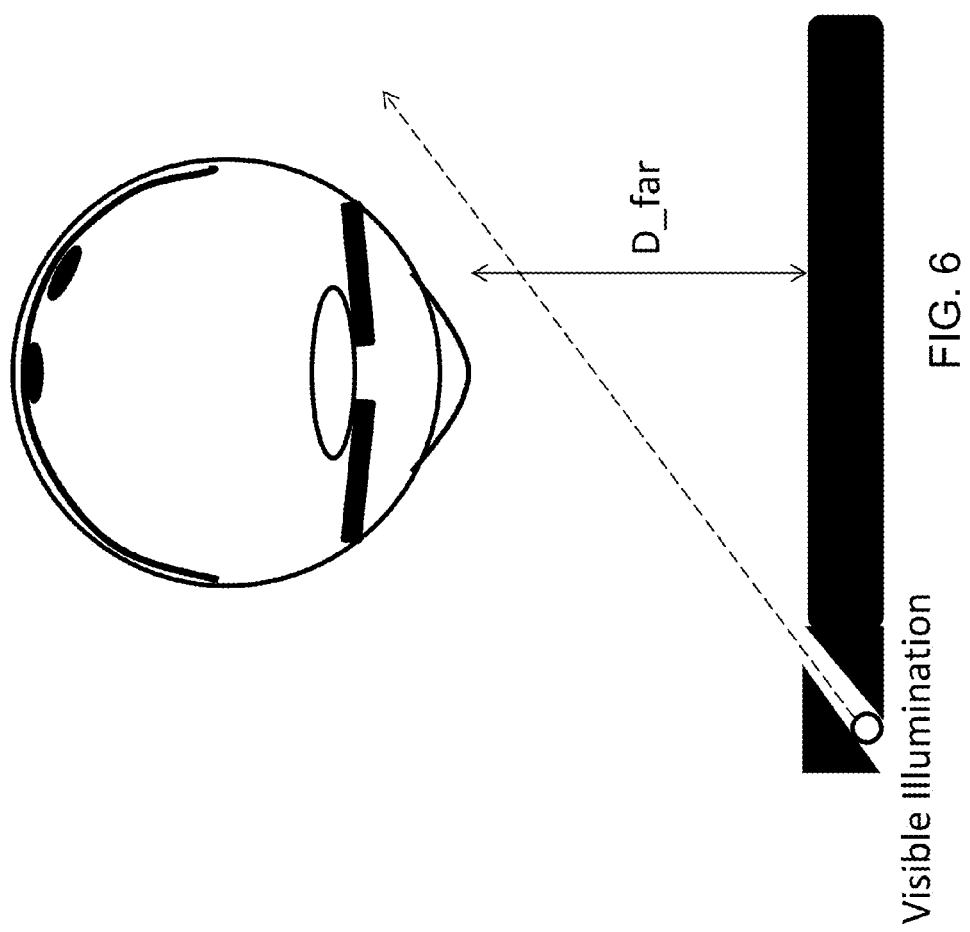

In some embodiments, for example as depicted in FIG. 6, as a user brings the biometric system (e.g., portable device) towards the user's eye from a distance, the visible light source or illumination may be hardly visible to the user due to the methods described above for shaping or truncating the conical beam pattern of light from the light source. Whereas if the conical beam pattern from the light source was not truncated, the illumination could cause discomfort to the eye while at further distances due to a smaller incident angle theta. With a truncated beam pattern angled at an appropriate angle theta, the light beam may be virtually undetectable by the user as the biometric device moves closer into or further away from an optimal position for iris illumination.

Figure 7:
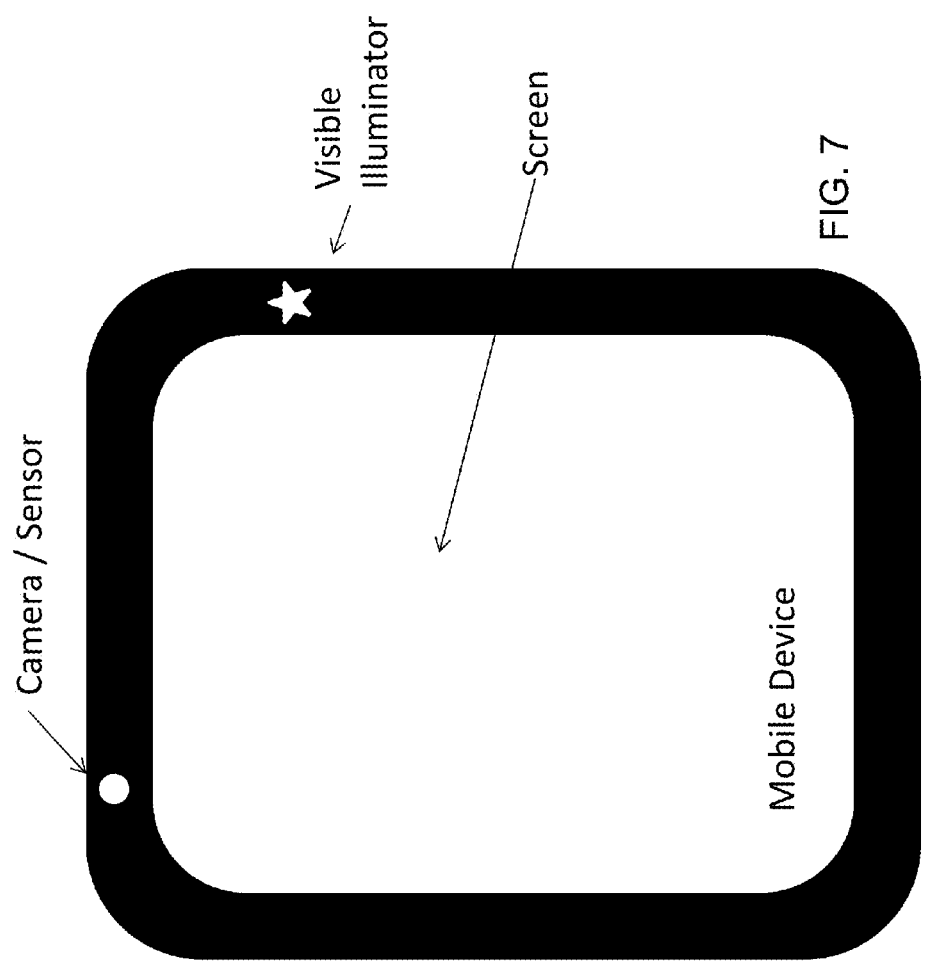

Referring now to FIG. 7, another embodiment of a system for providing visible illumination to an iris for biometric acquisition is depicted. The visible illuminator or light source may be located, positioned or incorporated on one side of a mobile device, for illuminating an iris for biometric capture. The mobile device may include or house a camera or sensor that can be used for biometric capture. In some embodiments, the visible light source may be located far from the camera/sensor, so that the angle theta between light from the illuminator incident on an eye, and the line of sight of the eye positioned in front of the camera, can be within an suitable or desired operating range (e.g., more than 30 degrees) for biometric acquisition. In certain embodiments, the camera/sensor and the visible illuminator may be located at opposite sides or ends of the biometric device.

Figure 8:
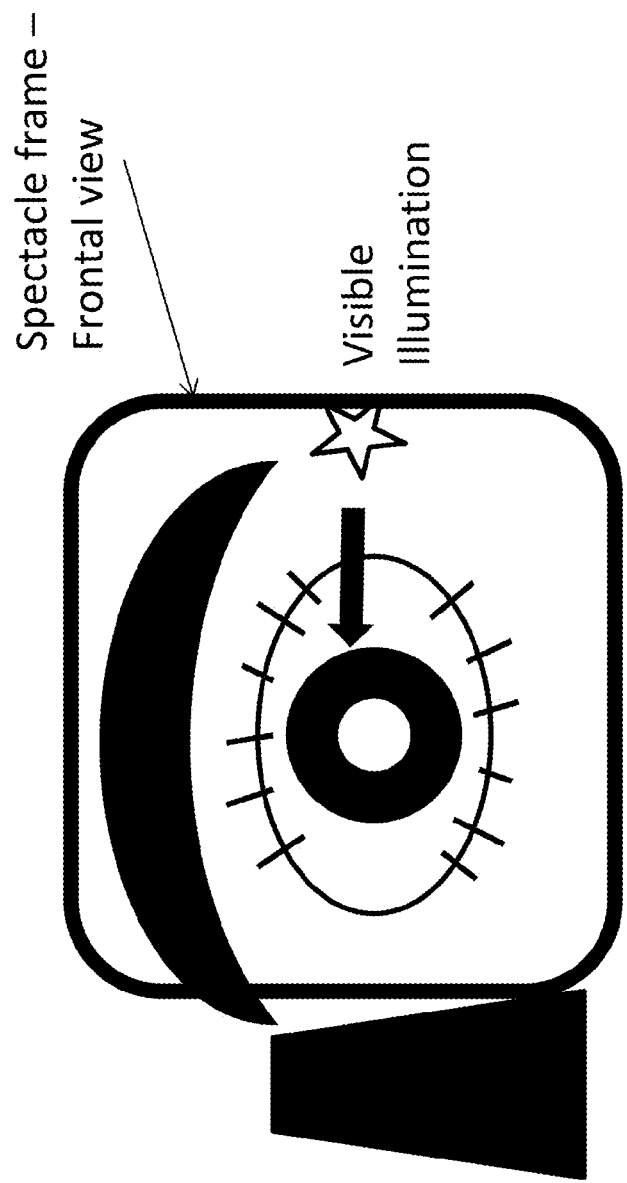
FIGS. 8 and 9 depict embodiments of a frame or device hosting a visible light source and worn or positioned over the eye.
Figure 9:
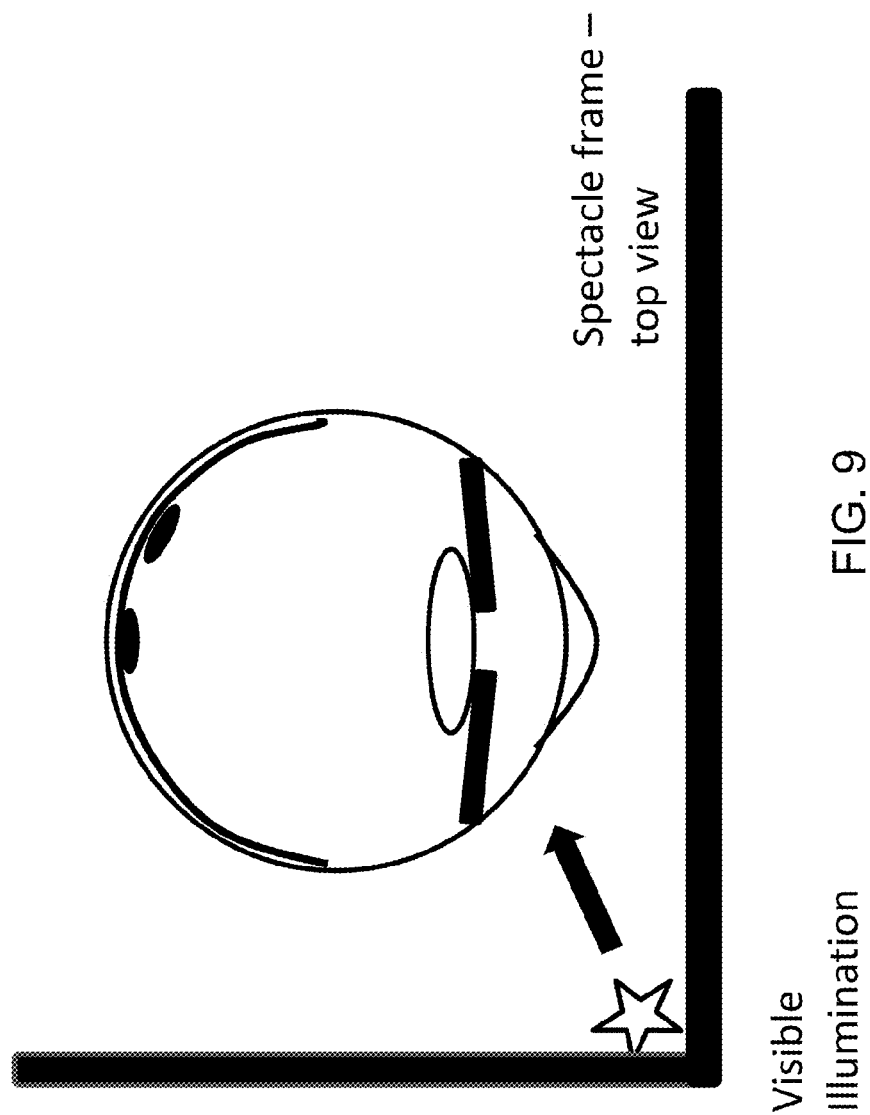

Referring now to FIG. 8, still another embodiment of a system for providing visible illumination to an iris for biometric acquisition is depicted. The visible illuminator or light source may be positioned or mounted on a frame or device worn by the user. For example, the light source may be mounted on one or both frames of glasses that a user may wear or is requested to wear (e.g., for biometric capture). The light source may be positioned to the side of an eye, as described above in connection with FIG. 3. FIG. 9 depicts one embodiment of a top view of a frame worn or positioned over the eye. The visible light source may be positioned or oriented so as to direct visible light at the eye for biometric capture of iris imagery. For example, the visible light source may be angled and/or positioned according to any of the ways described above in connection with FIGS. 2B through 6.

In certain embodiments, the visible illuminator may incorporate a photodiode that is sensitive to infra-red illumination. An external infra-red illuminator may be used to control the visible illuminator (e.g., on, off, intensity level). Such a setup may reduce the amount of, or any requirement for control wires and/or switches on the frame hosting the visible light source that is worn over the eye, face or head of the subject. In other embodiments, any other method of remote or wireless control may be used, such as the use of Bluetooth wireless communications.

Figure 10:
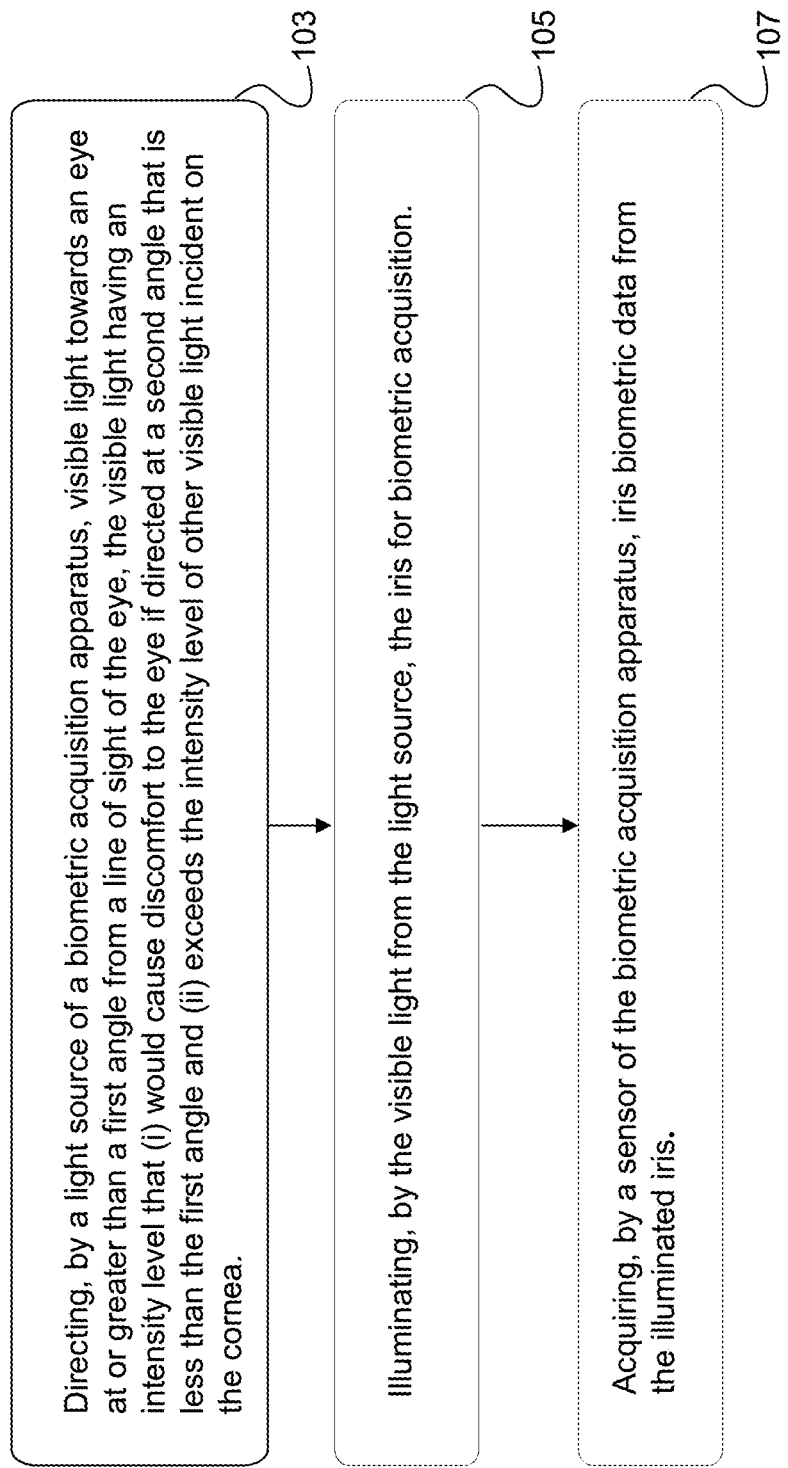
FIG. 10 depicts one embodiment of a method for illuminating an iris with visible light for biometric acquisition.

Referring now to FIG. 10, one embodiment of a method for providing visible illumination to an iris for biometric acquisition is depicted. In brief overview, the method includes directing, by a light source of a biometric acquisition apparatus, visible light towards an eye at or greater than a first angle from a line of sight of the eye, to illuminate a surface of the iris (103). The visible light may have an intensity level which would cause discomfort to the eye if directed at a second angle that is less than the first angle. The visible light may also have an intensity level that exceeds the intensity level of other visible or ambient light incident on the cornea or eye. The visible light illuminates substantially the whole iris of the individual (105). A sensor of the biometric acquisition apparatus acquires iris biometric data from the illuminated iris (107).

Referring now to (103), in more detail, a light source of a biometric acquisition apparatus directs visible light towards an eye at or greater than a first angle from a line of sight of the eye, to illuminate the iris. The light source may comprise a visible light source for any portion of the visible light spectrum. In some embodiments, the light source provides or produces infra-red light in addition to visible light. The light source may direct the visible light at an angle that avoids reaching a light-sensitive portion of the eye's retina. The light source may direct visible light at an angle of about 30 degree or more from the line of sight of the eye. The light source may direct visible light at or greater than a first angle from a line of sight of the eye such that the visible light has an intensity level which would cause discomfort to the eye if directed to the eye at a second angle that is less than the first angle. In various embodiments, the light source may direct visible light at an angle of at least theta degrees from a line of sight of the eye, where theta is determined such that the visible light does not reach a light-sensitive portion of the retina (e.g. fovea, parafovea and/or perifovea), or cause discomfort to the eye. The light source may direct visible light at an angle of at least theta degrees from a line of sight of the eye, where theta is determined such that a primary cone of influence of the visible light does not reach a light-sensitive portion of the retina. By way of illustration, and depending on the intensity and/or other characteristics of the light source, theta may be 22 degrees, 38 degrees, 45 degrees, 70 degrees, 90 degrees, or some other value. In some embodiments, the light source may direct visible light at the eye such that the visible light glances or makes contact with a side, edge or portion of the iris, or any other portion of the eye.

In some embodiments, the visible light may have an intensity level above that which causes discomfort to the eye if the visible light reaches a light-sensitive part of the eye's retina. The incident light may be angled such that the visible light (e.g., including the primary cone of influence of the incident visible light) does not reach a light-sensitive portion of the retina. For example, the light source may produce and/or direct light of an intensity or brightness level above 2.6 mW/cm2, 0.1 mW/cm^2 or 5 uW/cm^2, depending on the application and context. In certain embodiments, the visible light may have an intensity level much higher than a level that would otherwise cause discomfort in the eye. In some embodiments, the visible light may have an intensity level lower than 2.6 mW/cm2, 0.1 mW/cm^2 or 5 uW/cm^2. The visible light may have an intensity or brightness level lower than that which causes discomfort to the eye if the visible light reaches a light-sensitive part of the eye's retina. The light source may have an intensity level that exceeds the intensity level of visible ambient reflections off the cornea. The light source may have an intensity level that exceeds the intensity level(s) of other visible or ambient light incident on the cornea. The light source may have an intensity level that exceeds the combined and/or average intensity level(s) of other visible or ambient light incident on the cornea or eye. The light source may have an intensity level that exceeds the intensity level(s) of such light when reflected off the cornea. The light source may provide light of an intensity subject to safety limits for exposure to an eye.

The light source may direct the visible light towards the eye, the visible light having an intensity level below a threshold limit for safe exposure to the eye. The light source may provide or generate light of an intensity level necessary or adequate for illuminating an iris for biometric capture. The light source may provide or generate light of an intensity level that exceeds the intensity level of other visible and/or ambient light as discussed above. In some embodiments, the light source may direct or produce strobed or intermittent light at the eye. The strobed or intermittent light may have an average intensity or brightness level that is higher or lower than a level that would otherwise cause discomfort in the eye, e.g., if the light reaches a light-sensitive part of the retina.

In some embodiments, the light source directs visible light comprising non-isotropic illumination at or towards the eye. The light source may comprise a point light source directing a conical illumination beam at the eye, the conical illumination beam having a FWHB of less than 90 degrees. The light source may be a small or point light source of any shape. The FWHB of the source may itself be of a specific angle, e.g., 90, 40, 20, 10, 4 degrees. The light source may produce and/or direct a visible light beam of any shape or size. In some embodiments, the light source directs visible light comprising non-isotropic illumination at or towards the eye. The light source may comprise a non-isotropic or anisotropic light source. In certain embodiments, the light source may comprise an isotropic, collimated or directional light source.

In some embodiments, the light source directs the visible light towards a non-nasal side of the eye. The light source may direct the visible light from a non-nasal side of the eye. The light source may be positioned at an opposite side of the nose relative to the eye. The position and/or direction of the visible light may be selected so that there is less, little, minimal or no obstruction by facial features such as eyebrows, lashes, eyelid, cheek and/or nose. The light source directs the visible light from a side of the eye towards the non-nasal side of the eye, and/or at an angle theta as described above. The position and/or direction of the visible light may be selected so that shadows are minimized or not created by obstructing features on the iris. The position and/or direction of the visible light may be selected so as to avoid distorted or uneven illumination of the iris. In some embodiments, the light source may be arranged so as to avoid illumination of the eye as the user positions the biometric apparatus/device for use, e.g., until the apparatus/device is positioned within a suitable spatial region for biometric acquisition. The apparatus/device may include a channel for shaping light from the source to produce a light beam for illuminating the iris.

In some embodiments, the biometric apparatus includes a mobile device. The light source and the sensor may be both incorporated on the mobile device (e.g., cell phone or laptop). The light source and the sensor may be located at opposite sides or ends of the mobile device. The light source and the sensor may be separated in location to satisfy the theta angle requirements when the mobile device is positioned against an eye for biometric acquisition. In certain embodiments, the light source is mounted on a frame or device worn over the individual's eye, face or head. The light source and the biometric sensor may be separated in location to satisfy the theta angle requirements when the biometric apparatus (e.g., the sensor) is positioned against an eye for biometric acquisition. The light source on the frame or mobile device may be angled, positioned or oriented according to any of the configurations described herein.

In some embodiments, the biometric apparatus includes a screen providing visual cues to suitably position the light source relative to the eye for the biometric acquisition. The screen may include onscreen markers, bars or indicators to guide the user's eye against the sensor and/or the visible light source. The screen may include onscreen markers, bars or indicators located close to the sensor. In some embodiments, the biometric apparatus includes an audio feedback module providing audio cues to suitably position the light source relative to the eye for the biometric acquisition. He biometric apparatus may include one or more means, e.g., a screen, audio cues, mirror, projected light indicators, etc, for guiding a user position an eye against the sensor and/or the visible light source Referring now to (105), in more detail, the visible light illuminates substantially the whole iris of the individual. The light source may be configured to produce visible light of sufficient intensity to substantially illuminate the whole iris for biometric acquisition. The light source may be configured to produce a visible light beam (e.g., narrow light beam) of sufficient intensity to substantially illuminate the whole iris for biometric acquisition. For example, the light source directs a beam with a FWHB of less than 90 degrees, the visible light beam of sufficient intensity to illuminate the whole iris via light diffusion within a portion of the eye. In various contexts, the FWHB value may, for example, be 90, 40, 20, 10, 4 degrees. The intensity of the corresponding light beam may be adjusted or configured accordingly to substantially illuminate enough features of the iris for biometric acquisition. The light source may direct visible light of sufficient intensity to illuminate striations of the iris for biometric acquisition. The light source may direct visible light of sufficient intensity and/or at a specific angle relative to the line of sight of the eye, to illuminate enough striations and/or other features of the iris for biometric acquisition. The light source may direct visible light of sufficient intensity that exceeds the intensity of other visible and/or ambient light as discussed above.

In some embodiments, the biometric apparatus includes an illuminated screen or second visible light source for dilating the pupil. The biometric apparatus may include an illuminated screen or second visible light source for dilating the iris. The illuminated screen or second visible light source may be positioned sufficiently close to the eye to induce dilation. The illuminated screen or second visible light source may be configured to provide sufficient brightness to induce dilation but not discomfort.

Referring now to (107), in more detail, a sensor of the biometric apparatus acquires iris biometric data from the illuminated iris. The biometric apparatus may determine that the pupil or iris is dilated and ready for biometric acquisition. A user may activate the biometric apparatus to acquire the biometric data, e.g., based on an indicator of the apparatus indicating that the visible illumination and/or sensor is positioned within an optimal or suitable operating range or at an optimal or suitable operating point. In some embodiments, the biometric apparatus automatically initiates biometric capture when the illumination, sensor and iris are in position or are aligned. In certain embodiments, the biometric apparatus turns off the visible illuminator when it detects that the visible illuminator is angled within theta degrees, such that the visible illuminator may cause discomfort to the eye if not turned off.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor.

In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. An apparatus for acquiring biometric information of an individual, the apparatus comprising:
    a light source, directing a visible light beam towards an iris of an eye at a first angle that avoids a light-sensitive portion of the eye's retina, the visible light beam illuminating the iris for biometric acquisition and matching, the visible light beam having an incident intensity level that (i) would cause discomfort to the eye if directed at the light-sensitive portion of the retina, and(ii) is sufficient to illuminate striations of the iris for the biometric acquisition at a reflected intensity level that exceeds that of visible light reflected from the cornea due to other light sources; and
    a sensor, acquiring iris biometric data from the illuminated iris for the biometric matching.

2. The apparatus of claim 1, wherein the light source comprises a point light source directing the visible light beam at the eye, the visible light beam having a full width half brightness (FWHB) of less than 90 degrees.

3. The apparatus of claim 1, wherein the first angle is 30 degrees or greater relative to a line of sight of the eye.

4. The apparatus of claim 1, further comprising a mobile device, the light source and the sensor incorporated on the mobile device.

5. The apparatus of claim 1, wherein the light source is mounted on a frame or device worn over the individual's eye, face or head.

6. The apparatus of claim 1, wherein the light source directs the visible light beam towards a non-nasal side of the eye.

7. The apparatus of claim 1, wherein the light source directs the visible light beam comprising non-isotropic illumination at the eye.

8. The apparatus of claim 1, further comprising an illuminated screen or second visible light source for constricting the pupil.

9. The apparatus of claim 1, wherein the light source directs the visible light beam of sufficient intensity to illuminate the whole iris via light diffusion within a portion of the eye.

10. The apparatus of claim 1, wherein the light source directs the visible light beam towards the eye, the visible light having an intensity level below a threshold limit for safe exposure to the eye.

11. The apparatus of claim 1, wherein the light source may be arranged so as to avoid illumination of the eye as the user adjusts the apparatus for use, until the apparatus is positioned within a suitable spatial region for biometric acquisition.

12. The apparatus of claim 1, further comprising a channel for shaping visible light from the light source into the visible light beam for illuminating the iris.

13. The apparatus of claim 1, further comprising a screen providing visual cues to suitably position the light source relative to the eye for the biometric acquisition.

14. The apparatus of claim 1, further comprising an audio feedback module providing audio cues to suitably position the light source relative to the eye for the biometric acquisition.

15. A method for acquiring biometric information of an individual, comprising:
    directing, by a light source of a biometric acquisition apparatus, a visible light beam towards an iris of an eye at a first angle that avoids a light-sensitive portion of the eye's retina, the visible light beam illuminating the iris for biometric acquisition and matching, the visible light beam having an incident intensity level that (i) would cause discomfort to the eye if directed at the light-sensitive portion of the retina and (ii) is sufficient to illuminate striations of the iris for the biometric acquisition at a reflected intensity level that exceeds that of visible light reflected from the cornea due to other light sources; and acquiring, by a sensor of the biometric acquisition apparatus, iris biometric data from the illuminated iris for the biometric matching.

16. The method of claim 15, comprising directing the visible light beam from one of: a mobile biometric acquisition device on which the sensor is mounted, and a device worn over the individual's eye, face or head.

17. The method of claim 15, comprising directing the visible light beam towards the non-nasal side of the eye.

18. The method of claim 15, comprising directing the visible light beam comprising non-isotropic illumination at the eye.

19. The method of claim 15, further comprising using an illuminated screen or second visible light source to constrict the pupil.

* * * * *